(12) United States Patent
Schilder et al.

(10) Patent No.: US 10,270,123 B2
(45) Date of Patent: Apr. 23, 2019

(54) PREVENTION OF CELL-TO-CELL THERMAL PROPAGATION WITHIN A BATTERY SYSTEM USING PASSIVE COOLING

(71) Applicant: GM GLOBAL TECHNOLOGY OPERATIONS LLC, Detroit, MI (US)

(72) Inventors: Boris Schilder, Frankfurt am Main (DE); Horst Mettlach, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 513 days.

(21) Appl. No.: 14/593,966

(22) Filed: Jan. 9, 2015

(65) Prior Publication Data

US 2016/0204483 A1     Jul. 14, 2016

(51) Int. Cl.
| | |
|---|---|
| *H01M 10/6551* | (2014.01) |
| *H01M 10/6567* | (2014.01) |
| *H01M 10/0525* | (2010.01) |
| *H01M 10/625* | (2014.01) |
| *H01M 10/613* | (2014.01) |
| *H01M 10/659* | (2014.01) |

(52) U.S. Cl.
CPC ..... *H01M 10/0525* (2013.01); *H01M 10/613* (2015.04); *H01M 10/625* (2015.04); *H01M 10/659* (2015.04); *H01M 10/6551* (2015.04); *H01M 10/6567* (2015.04); *H01M 2220/20* (2013.01); *Y02E 60/122* (2013.01)

(58) Field of Classification Search
CPC ........................ H01M 10/6551; H01M 10/6767
See application file for complete search history.

(56) References Cited

U.S. PATENT DOCUMENTS

| | | | |
|---|---|---|---|
| 2006/0105230 A1* | 5/2006 | Fitter | H01M 2/362 429/61 |
| 2010/0136391 A1* | 6/2010 | Prilutsky | H01M 10/63 429/62 |

(Continued)

FOREIGN PATENT DOCUMENTS

CN            103022587            3/2013

OTHER PUBLICATIONS

Machine Translation of CN103022587.

*Primary Examiner* — Miriam Stagg
*Assistant Examiner* — Brent C Thomas
(74) *Attorney, Agent, or Firm* — Quinn IP Law

(57) ABSTRACT

Disclosed herein are liquid-cooled battery systems configured to prevent cell-to-cell thermal propagation. In one embodiment, a system includes a section configured to generate and store electrical energy through heat-producing electro-chemical reactions. A cooling system may be configured to generate a flow of a liquid coolant through the battery system to remove heat produced by the battery. Cooling fins may be configured to receive the flow of the liquid coolant through a primary coolant channel and to transfer heat from the battery to the liquid coolant. The cooling fins may also include a secondary coolant channel configured to be at least partially filled with a melting material configured to obstruct the liquid coolant from exiting through the aperture at temperatures below a temperature threshold. When the melting material melts, it permits some of the liquid coolant to exit the cooling fin and wet and cool the adjacent battery section.

20 Claims, 6 Drawing Sheets

(56) References Cited

U.S. PATENT DOCUMENTS

2013/0071699 A1* 3/2013 Heise ................ H01M 10/5004
　　　　　　　　　　　　　　　　　　　　　429/50
2014/0370255 A1* 12/2014 Baik ....................... B29C 71/02
　　　　　　　　　　　　　　　　　　　　　428/212

* cited by examiner

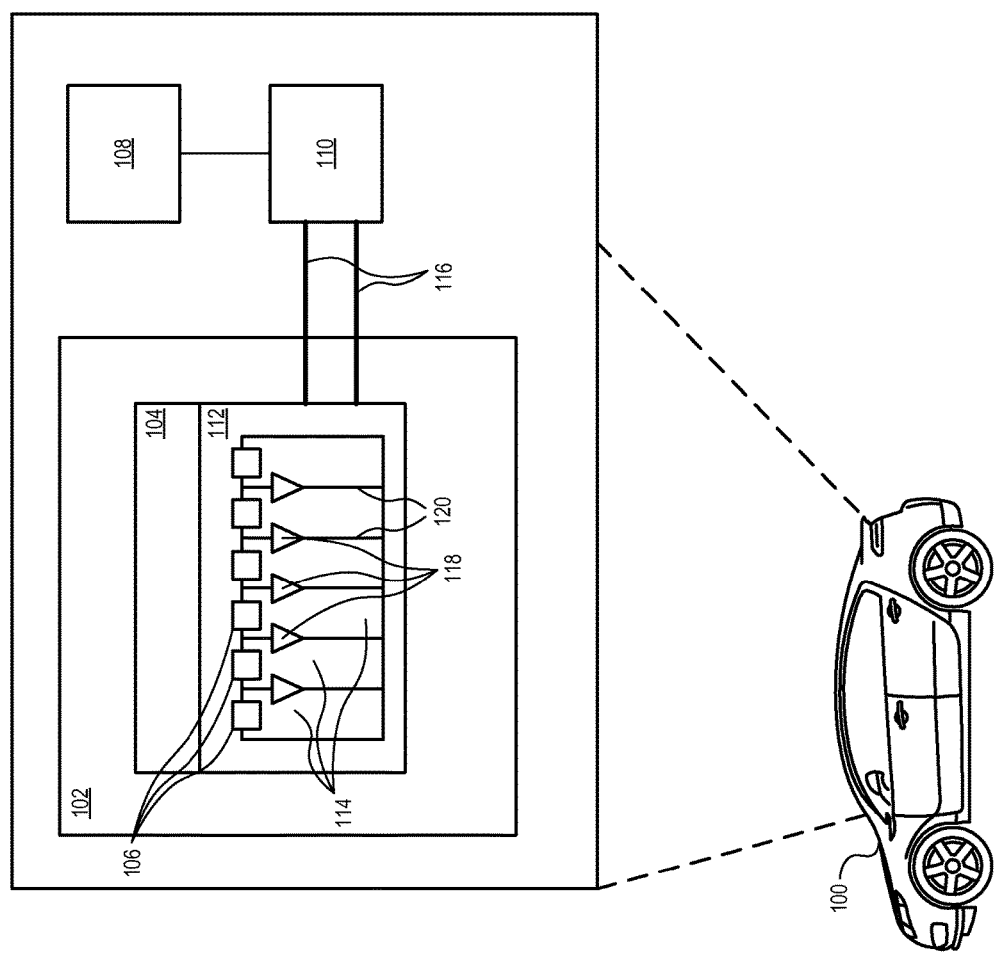

PREVENTION OF CELL-TO-CELL THERMAL PROPAGATION WITHIN A BATTERY SYSTEM USING PASSIVE COOLING

TECHNICAL FIELD

The field to which the disclosure generally relates includes methods and assemblies for preventing cell-to-cell thermal propagation within a battery system. More particularly, but not exclusively, the present disclosure may be applicable to liquid cooled batteries in which passive cooling is enabled when a section of a battery reaches a specified temperature. The passive cooling may cool the affected battery section and thereby prevent cell-to-cell propagation of a thermal runaway event.

BACKGROUND

The term thermal runaway event refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

A battery system may comprise a plurality of battery cells in relatively close proximity to one another. Various cooling systems may be designed to prevent the spread of heat from a cell experiencing a runaway thermal event to adjacent cells, since exposure of a battery cell to high temperature may cause the cell to experience a thermal runaway event.

The inventors of the present application have recognized that certain advantages may be realized by providing a secondary "cooling" system that may be used to contain a thermal runaway event and also operates passively (e.g., when the main cooling system is switched off, damaged, etc.). The present disclosure provides various embodiments of such a system and related methods. Use of a passive system may help to ensure reliable operation of the cooling system regardless of the other conditions that may have triggered the thermal event.

SUMMARY

The present disclosure pertains to liquid-cooled battery systems configured to prevent cell-to-cell thermal propagation and related methods. In one embodiment, a system includes a section configured to generate and store electrical energy through heat-producing electro-chemical reactions. A cooling system may be configured to generate a flow of a liquid coolant through the battery system to remove heat produced by the battery. Cooling fins may be configured to receive the flow of the liquid coolant through a primary coolant channel and to transfer heat from the battery to the liquid coolant. The cooling fins may also include a secondary coolant channel configured to be at least partially filled with a melting material configured to obstruct the liquid coolant from exiting through the aperture at temperatures below a temperature threshold. When the melting material melts, it permits some of the liquid coolant to exit through the cooling fin and wet and cool the adjacent battery section. In some embodiments, the threshold temperature may be approximately equal to a cell-to-cell thermal propagation threshold of the liquid-cooled battery system. The threshold temperature may be in a range from about 80° C. to about 100° C. for certain types of battery systems. In such embodiments, a suitable melting material may be polyethelene. As the liquid coolant exits the cooling fin through the secondary coolant channel, the liquid coolant may directly contact an adjacent battery section. The contact of the liquid coolant with the battery section may result in heat to an environment by convection and/or evaporation.

In some embodiments, the system may be configured to operate passively. In one specific embodiment, a coolant reservoir in fluid communication with the cooling system may be disposed above the secondary coolant channel. Accordingly, the coolant may exit through the secondary coolant channel passively under the influence of gravity when the melting material is at least partially melted. In some embodiments, the fluid reservoir may be pressurized, and the coolant may exit through the secondary coolant channel passively due to pressure in the pressurized coolant reservoir when the melting material is at least partially melted.

In some embodiments, a cooling fin may be disposed between two battery sections, such that one battery section contacts a first side of the cooling fin and a second battery section contacts a second side of the cooling fin. In other embodiments, one side of a battery section may contact a cooling fin and the other side may contact a foam layer. Cooling fins consistent with the present disclosure may include a manifold in fluid communication with the primary coolant channel. The manifold may be configured to distribute the coolant to a plurality of mini-channels disposed across at least a portion of the cooling fin. In some embodiments, the secondary coolant channel may be disposed in proximity to the manifold.

A method consistent with embodiments of the present disclosure may include providing a liquid-cooled battery system having a plurality of battery sections. The battery sections may be operated to generate and store electrical energy through heat-producing electro-chemical reactions. The method may further involve circulating a liquid coolant through a primary coolant channel in a cooling fin in proximity to at least one of the plurality of battery sections, and obstructing the liquid coolant from exiting the cooling fin through a secondary coolant channel at temperatures below a temperature threshold using a melting material. The liquid coolant may be permitted to exit the cooling fin through the secondary coolant channel by at least partially melting the melting material. The exiting coolant may cool one or more battery sections in proximity to the cooling fin.

BRIEF DESCRIPTION OF THE DRAWINGS

Non-limiting and non-exhaustive embodiments of the disclosure are described, including various embodiments of the disclosure, with reference to the figures, in which:

FIG. 1 illustrates a block diagram of an exemplary battery system having a secondary cooling system in a vehicle consistent with embodiments of the present disclosure.

DETAILED DESCRIPTION

Figure 2A:
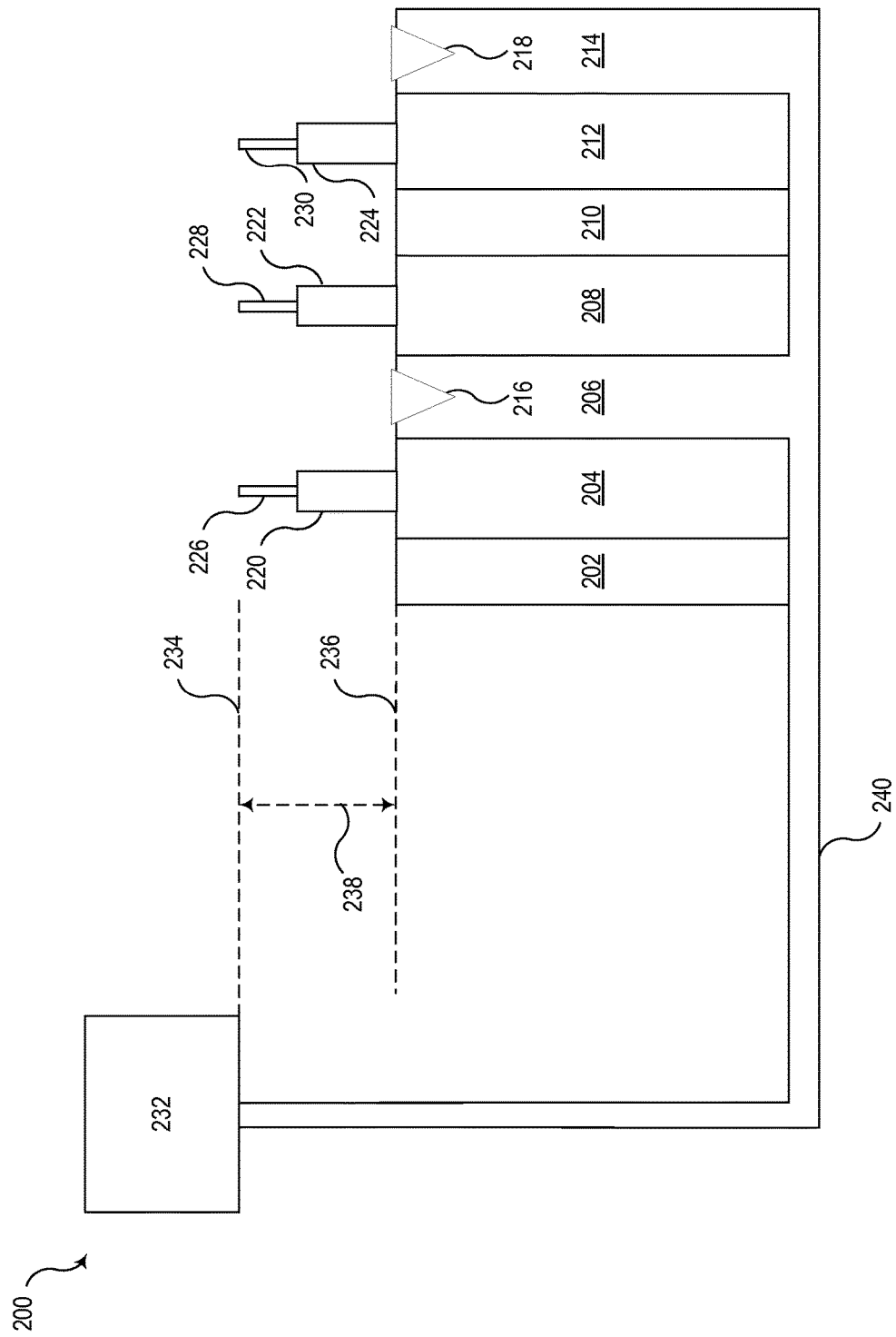
FIG. 2A illustrates a conceptual representation of a battery system including a passive cooling system configured to prevent cell-to-cell thermal propagation consistent with embodiments of the present disclosure.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

FIG. 1 illustrates a block diagram of an exemplary battery system 102 having a passive cooling system in a vehicle 100 consistent with embodiments of the present disclosure. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, a fuel cell ("FC") drivetrain, and/or any other type of drivetrain suitable for incorporating the systems and methods disclosed herein. The vehicle 100 may include a battery system 102 that, in certain embodiments, may be an HV battery system. The HV battery system may be used to power electric drivetrain components (e.g., as in an electric, hybrid, or FC power system) and a vehicle cabin climate control system, which may include a heater and/or compressor. In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like. Still further, in some embodiments the battery system may be configured to operate in mild-hybrid applications and may have a mid-range voltage (e.g., about 42 volts).

A cooling system 110 may be configured to generate a flow of coolant (e.g. water-glycol, dielectric liquid, refrigerant, air) that is used to maintain a temperature of the battery system 102 within a specified range. The cooling system 110 may be in fluid communication with the battery system 102 through one or more coolant lines 116. In certain embodiments, a coolant may absorb heat from battery system 102 as it flows through the battery system 102. The heated coolant may flow back to the cooling system 110, where the heat absorbed by the coolant may be transferred to the environment. As discussed in greater detail below, the cooling system 110 may further include a passive cooling system that may be configured to provide a passive flow of coolant based in response to a thermal event. In some embodiments, the passive cooling system configured to prevent cell-to-cell thermal propagation may be separate from a cooling system configured to cool the battery system 102 in normal operation. In other embodiments, the passive cooling system may be partially or fully integrated with the cooling system configured to cool the battery in normal operation. A plurality of secondary cooling conduits 118 may be disposed in proximity to cells or subdivisions 114. The secondary cooling conduits 118 may be filled with a substance configured to melt in response to a thermal event. In some embodiments, the substance may be selected at a temperature that is below a threshold that may result in cell-to-cell propagation of a thermal event. In one specific embodiment, the temperature range may comprise approximately 80° C. to 100° C. In such an embodiment, the secondary cooling conduits 118 may be at least partially filled with polyethelene. In alternative embodiments, the secondary cooling conduits 118 may be at least partially filled with other materials.

In some embodiments, a coolant reservoir (not shown) may be elevated with respect to the secondary cooling conduits 118, such that coolant may drain under the influence of gravity from the coolant reservoir. Draining of the coolant under the influence of gravity may permit the operation of a passive coolant system without the need for pumps or other mechanisms for actively circulating coolant.

The battery system 102 may include a battery control system 104. The battery control system 104 may be configured to monitor and control certain operations of the battery system 102. For example, the battery control system 104 may be configured to monitor and control charging and discharging operations of the battery system 102. In certain embodiments, the battery control system 104 may be communicatively coupled with one or more sensors 106 (e.g., voltage sensors, current sensors, temperature sensors, humidity sensors and/or the like, etc.) and/or other systems configured to enable the battery control system 104 to monitor and control operations of the battery system 102.

Information from sensors 106 may be used by the control system 104 to operate the cooling system 110. Temperature and/or humidity sensors 106 may provide data to the battery control system 104, which in turn may be configured to monitor and control the battery system 102 and to appropriately operate the cooling system 110. Specifically, the cooling system 110 may be operated to maintain the temperature of the battery system 102 within a predetermined temperature range.

The battery control system 104 may further be configured to provide information to and/or receive information from other systems included in the vehicle 100. For example, the battery control system 104 may be communicatively coupled with an internal vehicle computer system 108 and/or the cooling system 110. In certain embodiments, the battery control system 104 may be configured, at least in part, to provide information regarding the battery system 102 to a user of the vehicle 100, vehicle computer system 108, and/or the cooling system 110. Such information may include, for example, battery state of charge information, battery operating time information, battery operating temperature information, and/or any other information regarding the battery system 102.

The battery system 102 may include one or more battery packs 112 suitably sized to provide electrical power to the vehicle 100. Each battery pack 112 may include one or more subdivisions 114. The subdivisions 114 may comprise sub-packs, each of which may comprise one or more battery cells utilizing any suitable battery technology. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery); nickel manganese cobalt ("NMC"), lithium iron phosphate ("LFP"), lithium manganese oxide ("LMO"), and/or other suitable battery technologies and combinations thereof (e.g., mixed-chemistry battery technologies). Various battery technologies operate different technologies, and one of skill in the art will recognize that adjustments to the present disclosure may be made to accommodate the specific operating conditions of each type of battery. For example, selection of suitable melting materials may be based, at least in part, on the operating temperature of different types of battery systems.

Each subdivision 114 may be associated with a sensor 106 configured to measure one or more parameters (e.g., voltage, current, impedance, temperature, etc.) associated with each battery subdivision 114. Although FIG. 1 illustrates separate sensors 106 associated with each battery section 114, in some embodiments a sensor configured to measure various parameters associated with a plurality of subdivisions 114 may also be utilized. The parameters measured by sensor 106 may be provided to battery control system 104. Using the electrical parameters, battery control system 104 and/or any other suitable system may coordinate the operation of battery system 102.

FIG. 2A illustrates a conceptual representation of a battery system including a passive cooling system configured to prevent cell-to-cell thermal propagation consistent with embodiments of the present disclosure. In the illustrated embodiment, three cells, 204, 208, and 212 may be configured to store and release electrical energy through electrochemical reactions. In various embodiments, the cells may utilize various chemistries, such as lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), nickel manganese cobalt ("NMC"), lithium iron phosphate ("LFP"), lithium manganese oxide ("LMO"), and/or other suitable battery technologies and combinations thereof (e.g., mixed-chemistry battery technologies). Each of the battery cells 204, 208, and 212 may be associated with an anode 220, 222, and 224, respectively, and a cathode 226, 228, and 230, respectively. The battery cells 204, 208, and 212 may store and generate electrical energy using heat producing electrochemical processes. Other components disposed in proximity to the battery cells 204, 208, and 212 may be configured to dissipate the heat generated by the battery cells 204, 208, and 212, and to maintain the battery cells within an operating temperature range.

Foam layers 202 and 210 may be disposed between adjacent battery cells (e.g., battery cells 208 and 212). Foam layers 202 and 210 may provide space for cell expansion and thermal insulation between adjacent battery cells.

Cooling fins 206 and 214 may be disposed between adjacent battery cells on the opposite sides from the foam. The pattern of foam layers, cells, and cooling fins may be repeated more extensively in various embodiments even though only a few components are illustrated in FIG. 2A. The cooling fins 206 and 214 may be configured to dissipate the heat generated by the battery cells 204, 208, and 212, and to maintain the battery cells within an operating temperature range.

The cooling fins may be configured to receive a flow of coolant from a coolant reservoir 232. The coolant reservoir 232 may be in fluid communication with the cooling fins 206 and 214 and may provide a flow of coolant through a primary coolant conduit 240. In the illustrated embodiment, cut outs 216 and 218 may be in fluid communication with the coolant reservoir 232 via a secondary coolant conduit. The cutouts 216 and 218 may be filled with a melting material having a melting point below a temperature at which a thermal event may propagate from cell-to-cell. Under typical conditions, the melting material may remain in solid form and may obstruct the exit of the coolant from the cutouts 216 and 218. When temperatures reach or exceed a melting point of the melting material, the melting material may at least partially melt and permit at least a portion of the coolant to exit through the cutouts 216 and 218. In one embodiment, the coolant may pass through the cutouts 216 and 218 wetting a hot cell (e.g., any or all of battery cells 204, 208, and 212. The wetting of the hot cell may cool the cell by convection and/or evaporation.

Cooling of a hot cell may occur passively based on the arrangement of the coolant reservoir 232, the cutouts 216 and 218, and the cooling fins 206 and 214. The coolant may be configured to flow through the cutouts 216 and 218 under the influence of gravity. Passive operation may be facilitated in some embodiments by placing the coolant reservoir 232 above the cooling fins 206 and 214. In some embodiments, a height 238 may separate the bottom 234 of the coolant reservoir 232 from the top 236 of the cooling fins 206 and 214. In one specific embodiment, the height 238 may be the minimum height needed to cause the coolant to flow through the cutouts 216 and 218 under the influence of gravity.

Figure 2B:
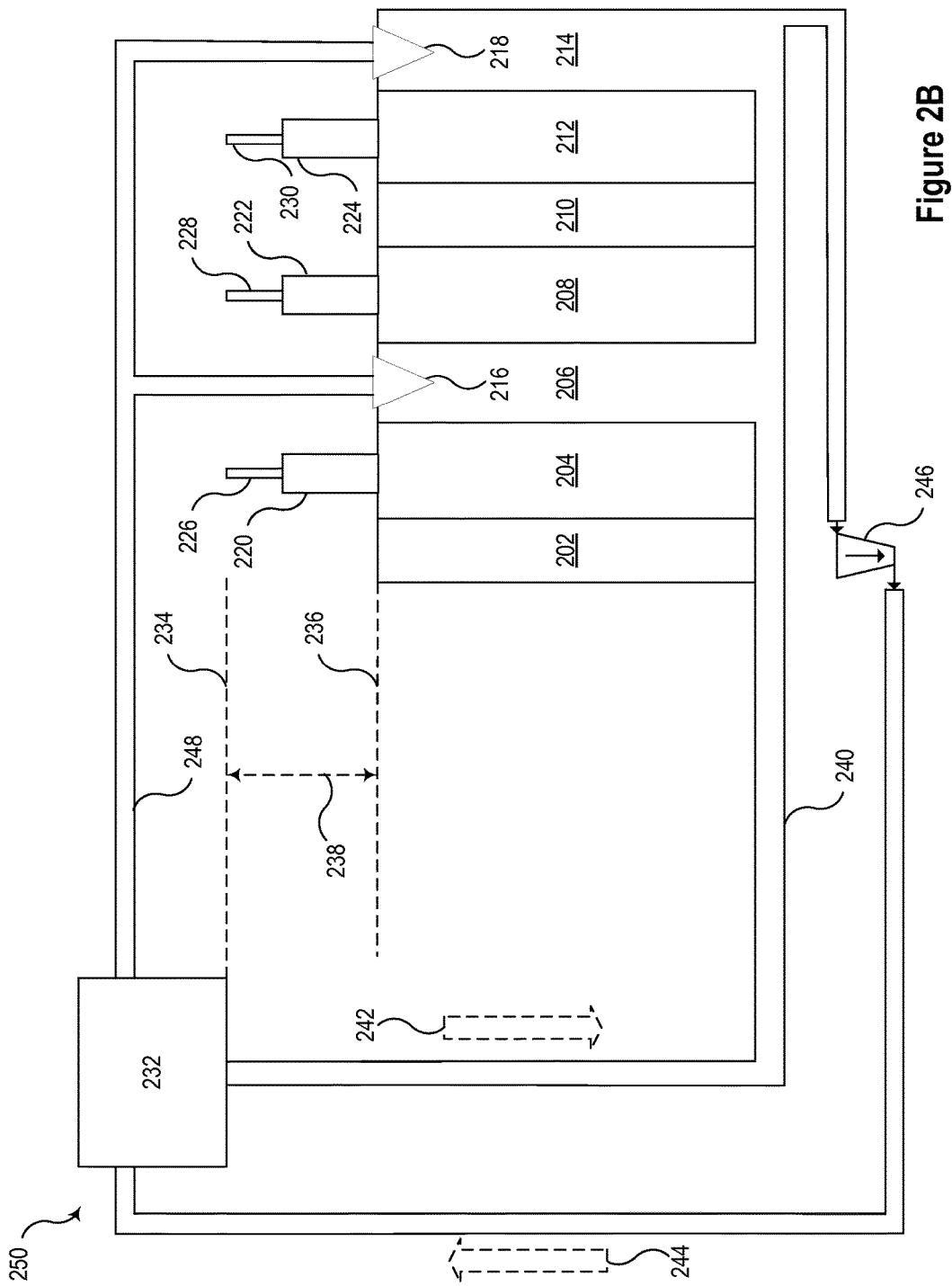
FIG. 2B illustrates another conceptual representation of a battery system including a passive cooling system configured to prevent cell-to-cell thermal propagation consistent with embodiments of the present disclosure.

FIG. 2B illustrates another conceptual representation of a battery system 250 including a passive cooling system configured to prevent cell-to-cell thermal propagation consistent with embodiments of the present disclosure. In general, system 250 may operate in a manner that is similar to system 200, as described in connection with FIG. 2A.

In system 250, the coolant may flow in the direction indicated by arrows 242 and 244, and may be actively circulated by a pump 246. The flow of coolant may be configured to maintain the temperature of the battery below a threshold, which may be selected to avoid thermal events and/or prevent cell-to-cell thermal propagation. A secondary coolant conduit 248 may also be in fluid communication with the coolant reservoir 232, and may be configured to selectively provide a flow of coolant to the cooling fins in the event that the cooling fins reach a predetermined temperature. Upon reaching or exceeding the predetermined temperature, a melting material disposed within cutouts 216 and 218 may at least partially melt and may permit coolant to exit from the cutouts 216 and 218. The coolant that exits from the cutouts 216 and 218 may wet a hot cell (e.g., any or all of battery cells 204, 208, and 212. The wetting of the hot cell may cool the cell by convection and/or evaporation, and may thus prevent a thermal runaway event from spreading to other battery cells in system 250.

Figure 3A:
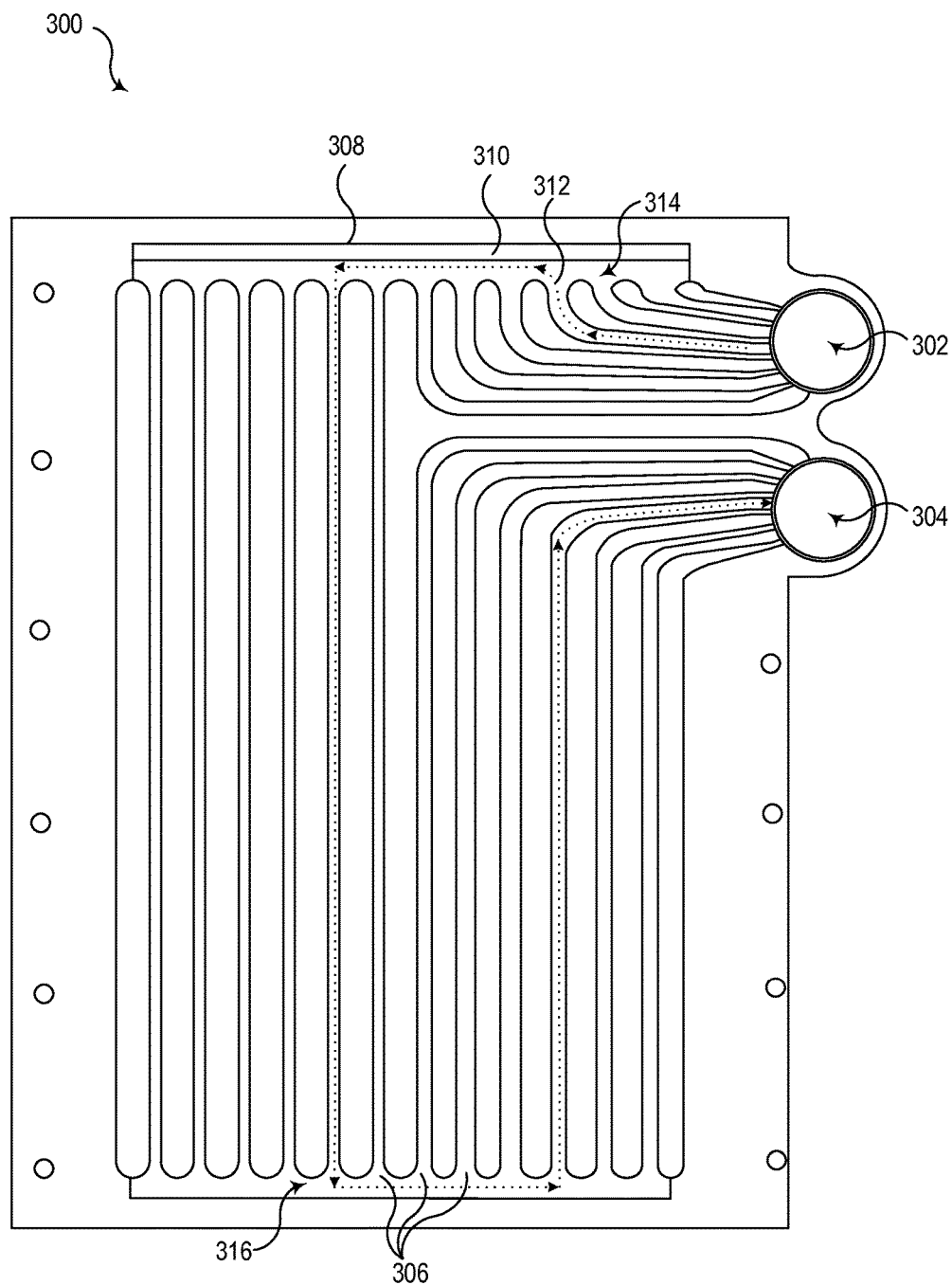
FIG. 3A illustrates a cooling fin configured for use in a liquid cooled battery system that also includes a passive cooling system configured to prevent cell-to-cell thermal propagation consistent with embodiments of the present disclosure.

FIG. 3A illustrates a cooling fin 300 configured for use in a liquid cooled battery system that also includes a secondary passive cooling system configured to prevent cell-to-cell thermal propagation consistent with embodiments of the present disclosure. The cooling fin 300 includes ports 302 and 304 through which coolant may be actively circulated by a primary cooling system. In some embodiments, the coolant may flow in opposite directions of the ports as it circulates through a closed-loop system. In other embodiments, the coolant may flow in the same direction through the ports 302 and 304 and a return path for the coolant in a closed-loop system may flow through another conduit.

A plurality of mini-channels 306 may be formed in the cooling fin to aid in the transfer of heat from the cooling fin to the environment. The plurality of mini-channels 306 may increase the ability of cooling fin 300 to transfer heat to the surrounding environment by circulating through the coolant throughout the fin. An exemplary flow of coolant through cooling fin 300 is shown by dotted line 312. In the illustrated embodiment, the flow of coolant comes from port 302 and flows into a top manifold 314. The coolant then flows through one of the mini-channels 306 to a bottom manifold 316. Then, the coolant enters another mini-channel 306, which returns the coolant to port 304.

A cutout 308 may be disposed along a top edge of the cooling fin 300 in proximity to top manifold 314. The cutout 308 may be filled with a melting material 310. When the temperature exceeds a melting point of the melting material 310, coolant may pass through the cutout 308 and may wet the cooling fin 300 and/or a battery cell (shown in FIG. 3B) disposed adjacent to the cooling fin 300. In the illustrated embodiment, the coolant may contact the melting material 310 in the top manifold 314. Accordingly, when the temperature is sufficiently high to at least partially melt the melting material 310, coolant may exit through at least a portion of the cutout 308. The cutout 308 may be referred to as a secondary coolant conduit.

Figure 3B:
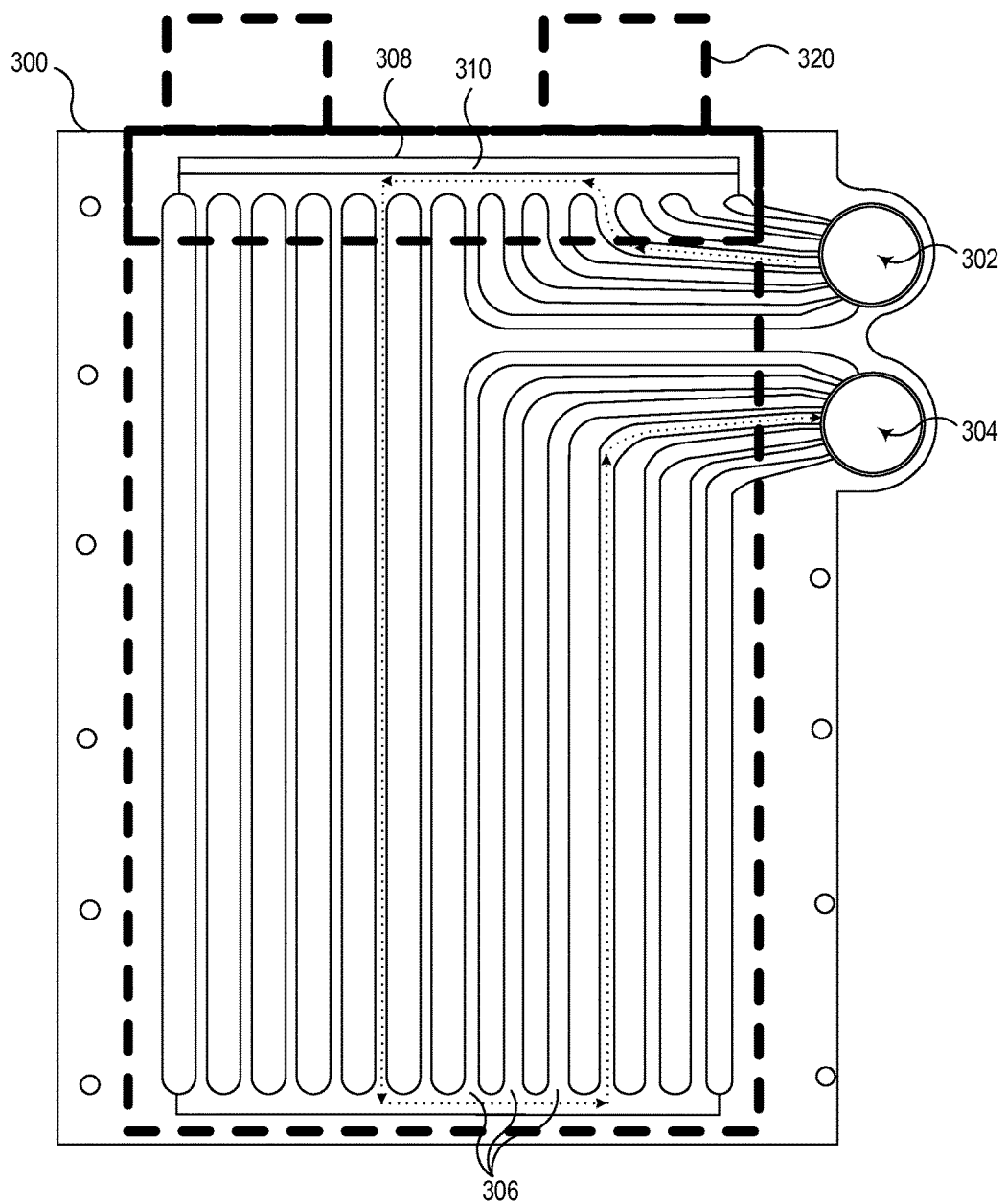
FIG. 3B illustrates the cooling fin of FIG. 3A together with a battery cell, consistent with embodiments of the present disclosure.

FIG. 3B illustrates a battery cell 320 (shown in dashed lines) disposed adjacent to the cooling fin 300 consistent with one embodiment. During normal operation, a flow of coolant through ports 302 and 304 and through the plurality of mini-channels 306 may remove heat generated by the battery cell 320. In the event that the temperature of the battery cell exceeds a threshold, the melting material 310 may at least partially melt and permit coolant to exit through the cutout 308. The coolant may wet the battery cell 320 and cool the cell.

Figure 4:
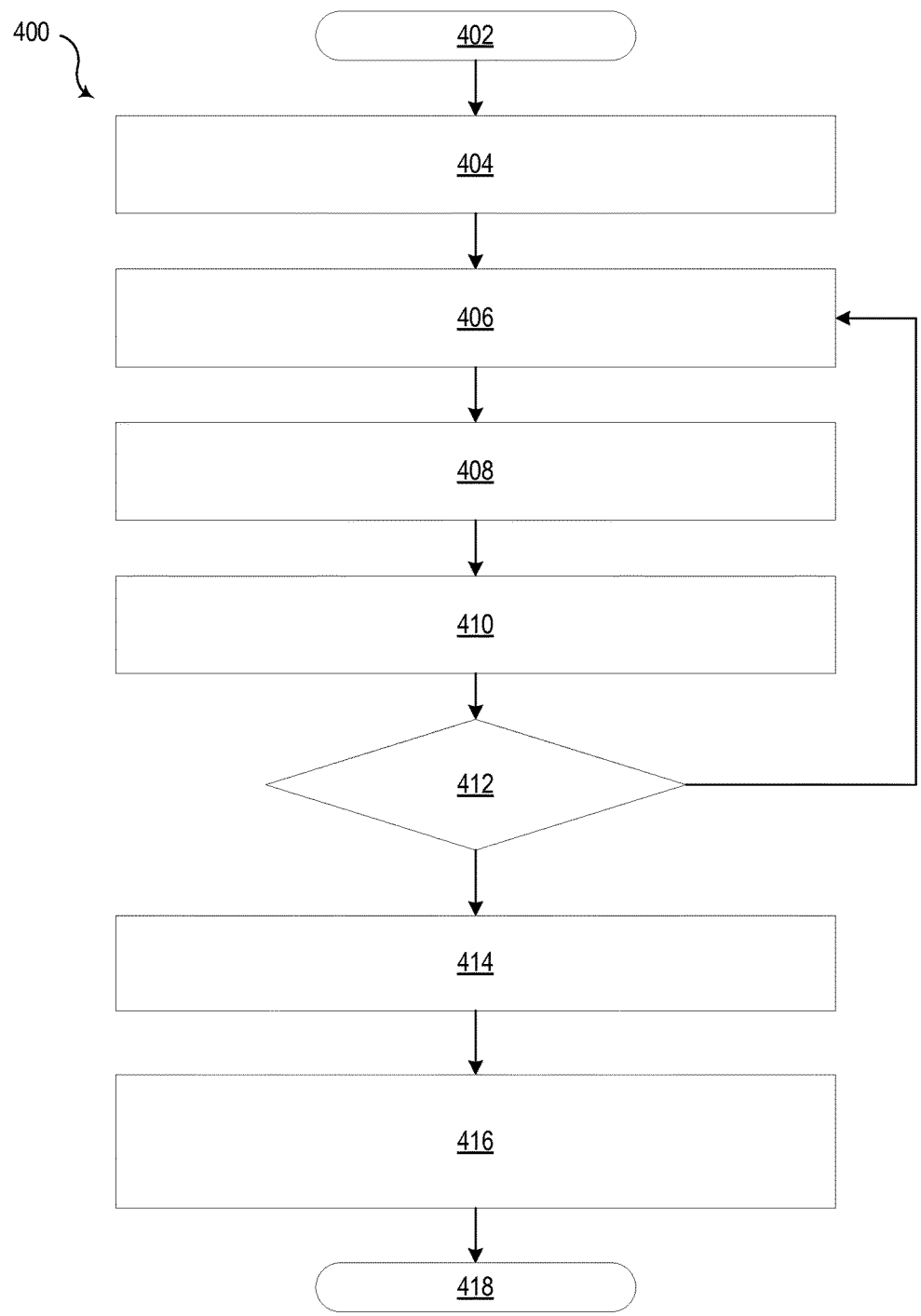
FIG. 4 illustrates a flow chart of a method for operation of a passive cooling system in a battery system configured to prevent cell-to-cell thermal propagation consistent with embodiments of the present disclosure.

FIG. 4 illustrates a flow chart of a method 400 of cooling a liquid-cooled battery system consistent with embodiments of the present disclosure. In various embodiments, method 400 may operate passively to cool a liquid-cooled battery system by selectively releasing a liquid coolant and wetting one or more sections of the battery system using pressure in a cooling system. In various embodiments, the pressure may be caused by gravity, by a pressure in a reservoir, etc. At 402, method 400 may begin. A liquid-cooled battery system having a plurality of battery sections may be provided at 404. At 406, at least one of the plurality of battery sections may be operated to generate and/or store electrical energy through heat-producing electro-chemical reactions. At 408, a liquid coolant may be circulated through a primary coolant channel in a cooling fin that is disposed in proximity to at least one of the plurality of battery sections. In some embodiments, the cooling fin may be disposed directly adjacent to one or more battery sections. At 410, a melting material may obstruct the liquid coolant from exiting the cooling fin through a secondary coolant channel using a melting material. In some embodiments, the secondary coolant channel may comprise an opening that transects one or more fluid conduits in the cooling fin.

Under certain circumstances, heat may be generated in the battery system at a faster pace than it can be transferred to the environment by the cooling system. Accordingly, the temperature may begin to rise in the battery system. At 412, if the temperature remains below a threshold, method 400 may return to 406. In contrast, if the temperature exceeds the threshold, method 400 may progress to 414.

At 414, the melting material may at least partially melt, which may permit the liquid coolant to exit from the cooling fin through a secondary coolant channel. The exiting liquid coolant, at 416, may cool one or more battery sections in proximity to the cooling fin. The coolant may wet the nearby battery sections, and thus cool the battery sections. The cooling effect may be increased as a result of directly wetting the cells by: reducing the thermal resistance between the liquid coolant and the cell; increasing the mass flow of liquid coolant; and for temperatures above saturation of the coolant, evaporating the coolant.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A liquid-cooled battery system configured to prevent cell-to-cell thermal propagation, the system comprising:
    a first battery section configured to generate and store electrical energy through heat-producing electro-chemical reactions;
    a cooling system configured to generate a flow of liquid coolant through the battery system, the flow of liquid coolant configured to remove heat produced by the first battery section; and
    a cooling fin configured to receive at least a portion of the flow of the liquid coolant through a plurality of primary coolant channels disposed across the cooling fin and to transfer heat from the first battery section to the liquid coolant, the cooling fin comprising:
        a secondary coolant channel configured as a cutout disposed along a top edge of the cooling fin, orthogonal to and spanning the plurality of primary coolant channels, such that the liquid coolant directly contacts a surface of the first battery section upon exiting the cooling fin, the cutout configured to be at least partially filled with a melting material configured to obstruct the liquid coolant from exiting through the cutout at temperatures below a temperature threshold;
        a coolant reservoir in fluid communication with the cooling system and disposed at a first height;
        wherein, the melting material at least partially melts at a threshold temperature and permits at least a portion of the liquid coolant to exit the cooling fin through the secondary coolant channel; and
        wherein the secondary coolant channel is disposed at a second height, the second height being lower than the first height, such that the coolant exits through the secondary coolant channel passively under the influence of gravity when the melting material is at least partially melted and the liquid coolant that exits the cooling fin directly contacts a surface of the first battery section.

2. The system of claim 1, wherein the threshold temperature comprises a cell-to-cell thermal propagation threshold of the liquid-cooled battery system.

3. The system of claim 1, wherein the threshold temperature comprises a range from about 80° C. to about 100° C.

4. The system of claim 1, further comprising a second battery section, and wherein the first battery section contacts a first side of the cooling fin and the second battery section contacts a second side of the cooling fin.

5. The system of claim 1, further comprising a foam layer, and wherein a first side of the first battery section contacts the cooling fin and a second side of the first battery section contacts the foam layer.

6. The system of claim 1, wherein the melting material comprises polyethelene.

7. A liquid-cooled battery system configured to prevent cell-to-cell thermal propagation, the system comprising:
   a first battery section configured to generate and store electrical energy through heat-producing electro-chemical reactions;
   a cooling system configured to generate a flow of liquid coolant through the battery system, the flow of liquid coolant configured to remove heat produced by the first battery section; and
   a cooling fin configured to receive at least a portion of the flow of the liquid coolant through a plurality of primary coolant channels disposed across at least a portion of the cooling fin and to transfer heat from the first battery section to the liquid coolant, the cooling fin comprising:
      a secondary coolant channel configured as a cutout disposed along an edge of the cooling fin, orthogonal to and spanning the plurality of primary coolant channels and configured to be at least partially filled with a melting material configured to obstruct the liquid coolant from exiting through the cutout at temperatures below a temperature threshold;
      a manifold in fluid communication with and configured to distribute the coolant to the plurality of primary coolant channels;
      wherein, the melting material at least partially melts at a threshold temperature and permits at least a portion of the liquid coolant to exit the cooling fin through the secondary coolant channel.

8. The system of claim 1, wherein the first battery section comprises a lithium-ion battery cell.

9. The system of claim 7, wherein the first battery section is disposed adjacent to the cooling fin and the liquid coolant that exits the cooling fin through the secondary coolant channel directly contacts a surface of the first battery section.

10. The system of claim 1, wherein the contact of the liquid coolant and the surface of the first battery section transfers heat to an environment by convection.

11. A liquid-cooled battery system configured to prevent cell-to-cell thermal propagation, the system comprising:
   a battery section configured to generate and store electrical energy through heat-producing electro-chemical reactions;
   a cooling system configured to generate a flow of a liquid coolant through the battery system, the flow of liquid coolant configured to remove heat produced by the first battery section;
   a coolant reservoir in fluid communication with the cooling system and disposed at a first height;
   a cooling fin, comprising:
      a plurality of conduits to distribute the coolant across at least a portion of the cooling fin;
      a cutout disposed along a top edge of the cooling fin, orthogonal to and spanning the plurality of conduits, and at a lower height than the coolant reservoir and in a fluid path of the liquid coolant;
      a melting material configured to obstruct the liquid coolant from exiting through the cutout at temperatures below a temperature threshold;
      wherein, the melting material at least partially melts at a threshold temperature and permits at least a portion of the liquid coolant to exit the cooling fin through the cutout passively under the influence of gravity.

12. The system of claim 1, wherein the contact of the liquid coolant and the surface of the first battery section transfers heat to an environment by evaporation.

13. The liquid-cooled battery of claim 7, wherein the threshold temperature comprises a cell-to-cell thermal propagation threshold of the liquid-cooled battery system.

14. The liquid-cooled battery of claim 7, wherein the threshold temperature comprises a range from about 80° C. to about 100° C.

15. The liquid-cooled battery of claim 7, further comprising a second battery section, and wherein the first battery section contacts a first side of the cooling fin and the second battery section contacts a second side of the cooling fin.

16. The liquid-cooled battery of claim 7, further comprising a foam layer, and wherein a first side of the first battery section contacts the cooling fin and a second side of the first battery section contacts the foam layer.

17. The liquid-cooled battery of claim 7, wherein the melting material comprises polyethelene.

18. The liquid-cooled battery of claim 7, wherein the first battery section comprises a lithium-ion battery cell.

19. The liquid-cooled battery of claim 7, wherein the contact of the liquid coolant and the surface of the first battery section transfers heat to an environment by convection.

20. The liquid-cooled battery system of claim 11, wherein the aperture is disposed at one of the top and the side of the cooling fin such that the liquid coolant directly contacts a surface of the first battery section upon exiting the cooling fin.

* * * * *